United States Patent [19]

Jones

[11] Patent Number: 5,365,884
[45] Date of Patent: * Nov. 22, 1994

[54] ORNAMENTAL ASSEMBLY FOR USE IN NON-AQUATIC VIEWING CAGES OR THE LIKE

[76] Inventor: Richard L. Jones, 7989 Lakeshore, Lexington, Mich. 48450

[*] Notice: The portion of the term of this patent subsequent to Dec. 4, 2007 has been disclaimed.

[21] Appl. No.: 121,290

[22] Filed: Sep. 14, 1993

Related U.S. Application Data

[60] Continuation of Ser. No. 936,104, Aug. 26, 1992, Pat. No. 5,257,596, which is a division of Ser. No. 619,229, Nov. 28, 1990, abandoned, which is a continuation-in-part of Ser. No. 325,219, Mar. 17, 1989, Pat. No. 4,974,545.

[51] Int. Cl.$^5$ .............................................. A01K 63/00
[52] U.S. Cl. ..................................... 119/256; 119/247; 248/206.2; D6/565; D30/106
[58] Field of Search ................. 119/256, 247, 253, 26, 119/17, 15, 174; D6/565; 248/206.2, 206.3, 206.4; D11/130; D30/104, 106

[56] References Cited

U.S. PATENT DOCUMENTS

| | | | |
|---|---|---|---|
| 2,908,519 | 10/1959 | Holden | 287/87 |
| 4,552,093 | 11/1985 | Packett | 119/17 |
| 4,699,829 | 10/1987 | Willinger | 428/17 |
| 4,708,089 | 11/1987 | Goldman et al. | 119/5 |
| 4,820,556 | 4/1989 | Goldman et al. | 119/253 |
| 5,018,480 | 5/1991 | Goldman et al. | 119/26 |
| 5,028,026 | 7/1991 | Phillipps et al. | 248/206.2 |

*Primary Examiner*—John G. Weiss
*Attorney, Agent, or Firm*—Harness, Dickey & Pierce

[57] ABSTRACT

An ornamental assembly for use in a non-aquatic viewing cage of the like is disclosed. The ornamental assembly includes a body member formed from a natural indiscriminate piece of driftwood and a fastening assembly for semi-permanently fixably securing the body member to any surface of the viewing cage.

2 Claims, 2 Drawing Sheets

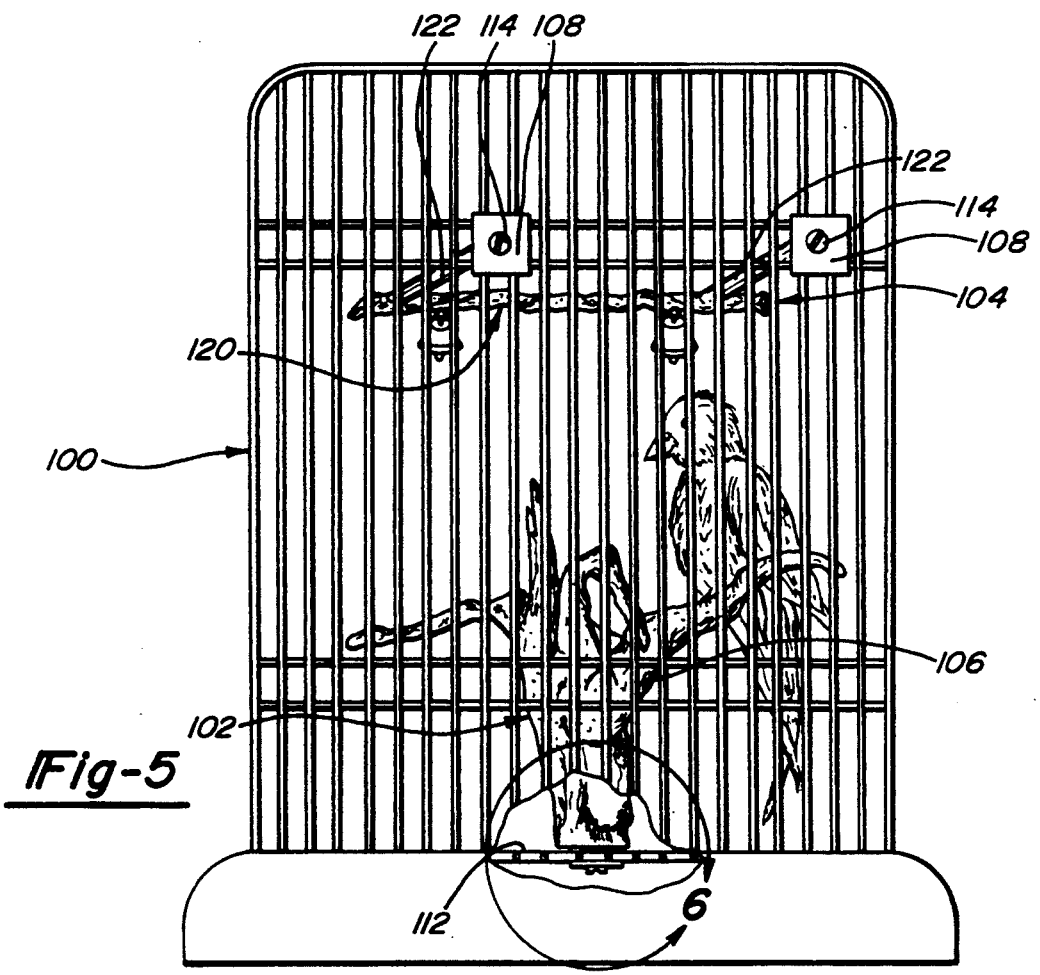
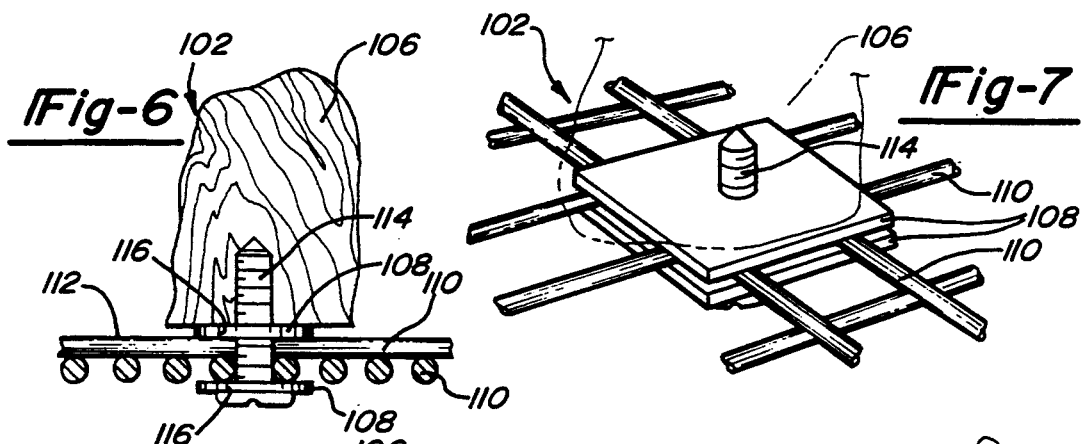
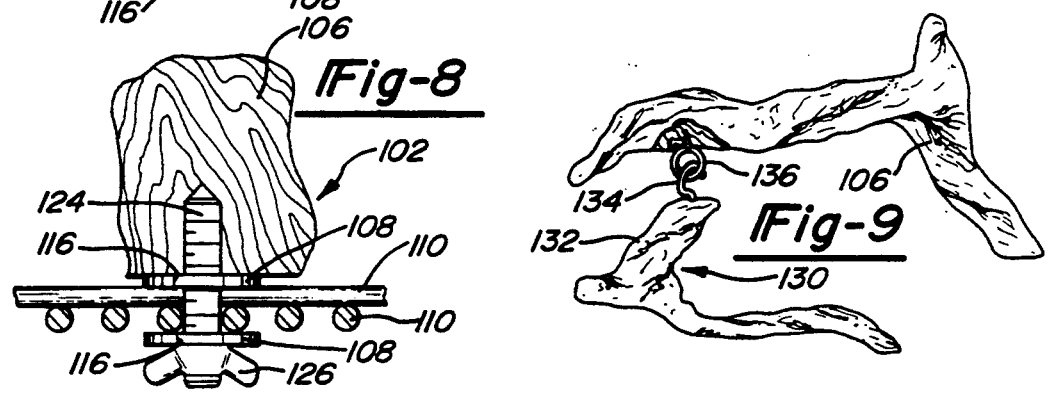

ORNAMENTAL ASSEMBLY FOR USE IN NON-AQUATIC VIEWING CAGES OR THE LIKE

CROSS REFERENCE TO RELATED U.S. APPLICATIONS

This is a continuation of U.S. patent application Ser. No. 936,104, filed Aug. 26, 1992, now U.S. Pat. No. 5,257,596, which is a divisional of Ser. No. 619,229, filed Nov. 28, 1990, which is a continuation in part of Ser. No. 325,219, filed Mar. 17, 1989 (U.S. Pat. No. 4,974,545).

BACKGROUND AND SUMMARY OF THE INVENTION

The present invention relates generally to ornamental implements for use in viewing tanks and, more particularly, to driftwood implements and the like for use in non-aquatic viewing tanks and cages.

Viewing tanks and cages are used to confine various types of natural life forms such as fish, small reptiles, rodents, birds and the like for the enjoyment of the viewer. Typically, viewing tanks and cages are equipped with ornate articles and implements such as artificial foliage, pieces of driftwood, sunken ships and other decorative devices which provide an aesthetically pleasing environment.

Generally, the ornate articles and implements which are commercially available for use in viewing tanks are provided with weighted base members. The weighted base member counteracts the buoyancy of the water in aquatic tanks and prevents accidental tipping of the implement in non-aquatic tanks and cages. The base members must be sufficiently weighted to prevent such undesirable tipping or floatation of the ornamental articles within the tank.

Alternatively, other commercially available ornamental devices are provided with base members having a relatively large peripheral area which must be covered by a blanketing material such as gravel, sand, or the like provided at the bottom of the viewing tank. The weight of the blanketing materials acts to maintain the decorative device at the bottom of the viewing tank. As such, installation of such decorative devices is restricted to the bottom surface of viewing tanks and such that the ability to freely orient and position such decorative devices within a viewing tank or cage is severely limited.

Because conventional ornate implements are aesthetic accessories which are not permanently attached to an inner surface of the viewing tank, it is not unusual for unanticipated tipping or movement to occur. This undesirable movement is aggravated by the normal activity of the fish, birds, or other life forms confined within the viewing tank. Therefore, it is very desirable to provide means for permitting semi-permanent or removable attachment of the decorative devices within the viewing tank which prevents undesirable tipping and movement. The novelty of the present invention is its functional utility as a decorative viewing tank implement which is capable of being semi-permanently secured to any surface within the viewing tank without the requirement of base weighing or the use of sand or gravel.

Accordingly, it is a primary object of the present invention to provide an aesthetically pleasing ornamental implement for use in viewing tanks and cages, and a method of use, which prevents undesired tipping movement of the ornamental implement.

Another object of the present invention is to provide an ornamental implement which is semi-permanently and removably fixably securable to side and bottom surfaces of a viewing cage without the necessity of base weights or a blanketing material.

Yet another object of the present invention is to provide an improved ornamental implement, such as a piece of driftwood, capable of omni-positional movement so as to provide superior viewing tank aesthetics while maintaining a semi-permanent fixed association with any of the inner surfaces of the viewing tank.

Another object of the present invention provides an ornamental viewing tank implement or assembly which is very inexpensive, easy to use, and which is aesthetically pleasing.

Various advantages of the present invention will become apparent to one skilled in the art upon reading the following specification and drawings.

BRIEF DESCRIPTION OF THE DRAWINGS

FIG. 5 is a pictorial representation, partially broken away, showing ornamental driftwood implements installed in a non-aquatic viewing cage according to the teachings of the present invention;

FIG. 6 is a partial cross-sectional view illustrating the semi-permanent mounting components associated with a portion of an ornamental driftwood assembly shown in Circle "6" of FIG. 5;

FIG. 7 is an enlarged pictorial view with the driftwood body member removed, of the driftwood assembly of FIGS. 5 and 6;

FIG. 8 is a cross-sectional view, similar to FIG. 6, illustrating an alternative embodiment of the present invention; and FIG. 9 is a pictorial representation of a supplemental driftwood implement adapted for use with the driftwood assembly of FIG. 5.

DESCRIPTION OF THE PREFERRED EMBODIMENTS

Figure 1:
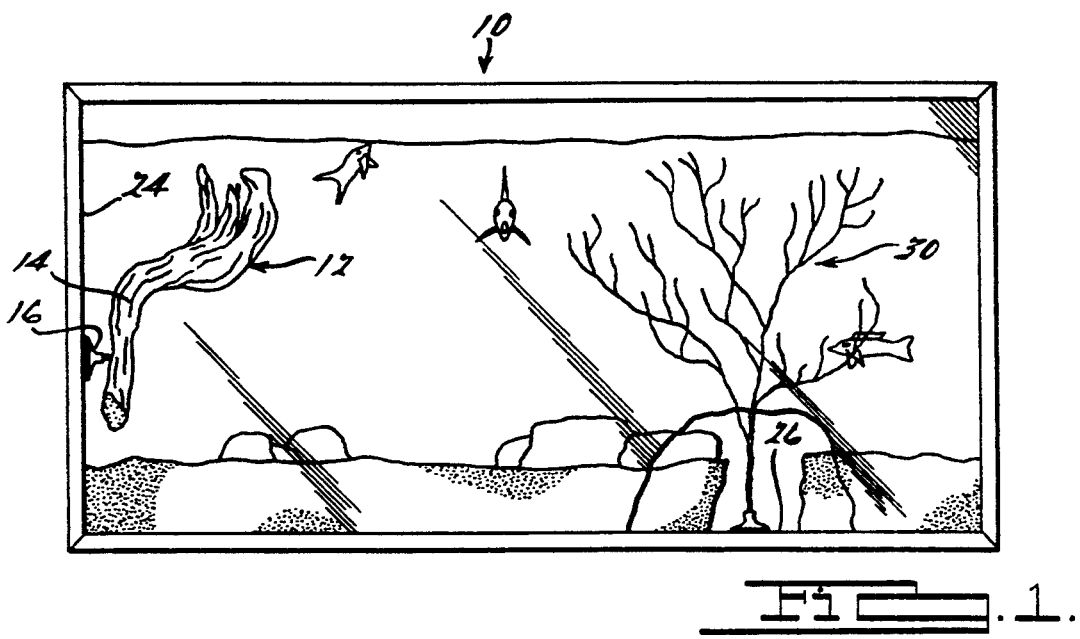
FIG. 1 is a pictorial representation of an ornament driftwood assembly and an artificial foliage implement used in an aquatic viewing tank according to the preferred embodiment of the present invention.

Referring to FIG. 1, a viewing tank 10 is depicted as an aquatic fish tank according to a preferred embodiment of the present invention. It is contemplated, however, that the principals embodied in the present invention are applicable to non-aquatic viewing tanks for life forms such as reptiles, turtles, mice and the like.

Figure 2:
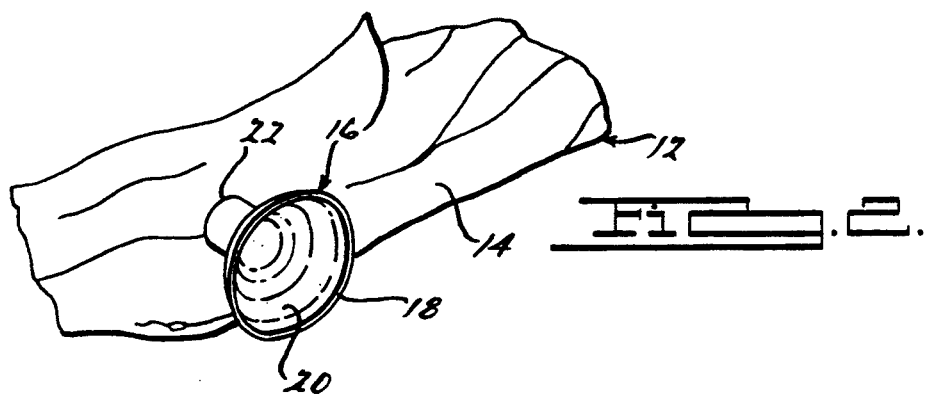
FIG. 2 is an enlarged pictorial view of a section of the ornamental driftwood assembly shown in FIG. 1, illustrating the components in more detail.

Referring to FIGS. 1 and 2, the aquatic viewing tank 10 is shown as having decorative articles including an ornamental driftwood assembly 12 contained within the inner area thereof. Specifically, driftwood assembly 12 comprises a body member 14 consisting of a piece of driftwood and a suction member 16. Suction member 16 is permanently affixed to driftwood body member 14. Suction member 16 includes a first end 18 which defines a suction producing surface, preferably configured to be a suction cup 20. A second end 22 of suction member 16 includes means for permanently affixing suction member 16 to decorative driftwood body member 14. Preferably the suction member 16 is mechanically attached to the driftwood body member 14 via a tack, screw or other like means.

Figures 3, 4:
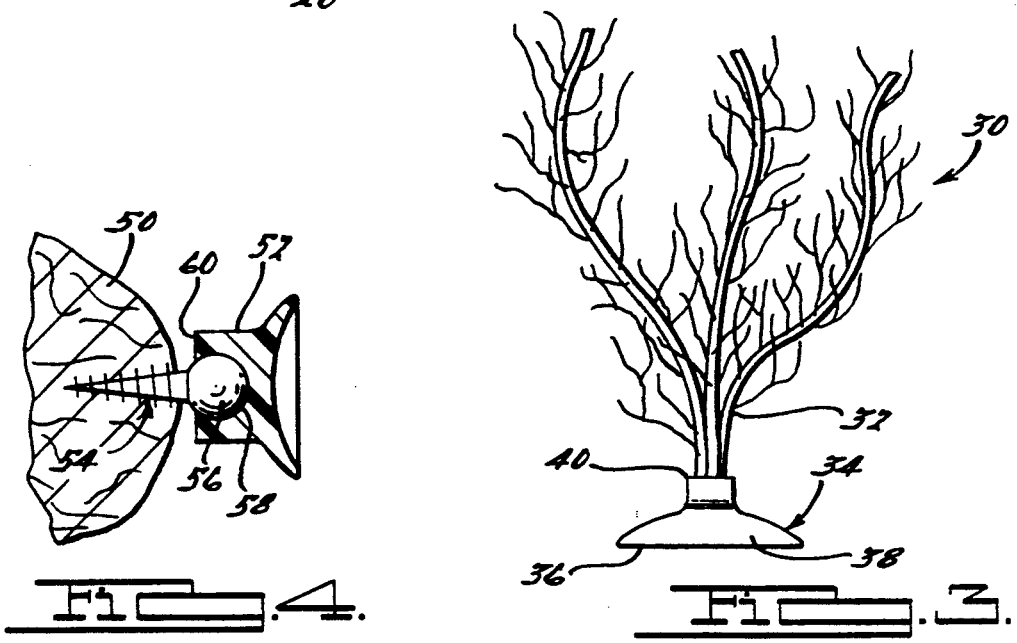
FIG. 3 is a pictorial representation of an ornamental implement consisting of artificial foliage similar to that shown broken away in FIG. 1.
FIG. 4 is a partial cross-sectional view illustrating the omni-positional characteristics of the present invention.

Referring now to FIGS. 1 and 3, the aquatic viewing tank 10 is shown as also including a second ornamental device according to the preferred embodiment of the present invention. Specifically, an ornamental foliage implement 30 is shown as having a foliage body member 32 and a suction member 34. Preferably, the foliage body member 32 is fabricated from plastic. Suction member 34 has a first end 36 configured as a suction cup 38 and a second end 40 configured as a socket to permit permanent attachment of body member 32 therein.

According to the present invention, suction member 16 may be permanently affixed to driftwood body member 14 in numerous orientations. Specifically, second end 22 of suction member 16 can be affixed coaxially with, or substantially perpendicular to, driftwood body member 14. Likewise, similar variations are available for permanently affixing suction member 34 to foliage body member 32 so as to define artificial foliage implement 30. Preferably, foliage body member 32 is secured in generally axial orientation relative to suction member 34 as shown in FIGS. 1 and 3.

In accordance with this invention, ornamental driftwood assembly 12 and ornamental foliage implement 30 can be semi-permanently or removably secured to any inner surface of the viewing tank 10. As shown in FIG. 1, driftwood assembly 12 is semi-permanently secured to a vertically extending inner surface 24 via engagement of suction cup 20 with the surface 24. Likewise, ornamental foliage implement 30 is shown to be semi-permanently attached to a lower horizontal surface 26 of viewing tank In application, the invention permits semi-permanent or removable engagement of the driftwood assembly 12 and the foliage implement 30 to any surface within the viewing tank without necessity of base weighing, gravel, sand or the like, which is typically required to avoid tipping or unintended floatation. The engagement of the suction cup 20 against the substantially planar surfaces produces a vacuum bond such that driftwood assembly 12 and foliage implement 30 can be semi-permanently attached to any such surface of viewing tank 10. Semi-permanent engagement will be maintained until the suction cups 20 and 38 of driftwood assembly 12 and foliage implement 30, respectively, are physically detached from the inner surface of viewing tank 10.

Another feature of the present invention is illustrated in FIG. 4. According to the preferred embodiment, body member 50, which can consist of either driftwood or artificial foliage, as previously defined, is permanently attached to suction meter 52 via attachment means which preferably consist of a screw 54. Screw 54 has a spherical head member 56 which is retained within a similarly configured spherical cavity 58 provided on the second end 60 of suction member 52. Cavity 58 has a slightly larger diameter than that of head member 56 of screw 54 so as to permit omni-directional movement of suction member 52 relative to screw 54. When suction cup 62 is semi-permanently secured to any inner surface of viewing tank 10, body member 50 may be rotated and/or pivoted relative to suction member 52 without the need of detaching suction cup 62. This omni-directional characteristic is provided by the generally unrestricted pivotal and rotational movement capability of the spherical head member 56 movably retained within cavity 58 of suction member 52.

With particular reference now to FIGS. 5 through 8, two embodiments are shown of decorative implements which are adapted for installation in non-aquatic viewing cages of the type used for confining life forms such as reptiles, turtles, mice, birds and the like. FIG. 5 illustrates a non-aquatic viewing cage 100 having decorative implements including a driftwood assembly 102 and a driftwood perch assembly 104 supported within an inner area thereof. These decorative implements are provided to support the weight of the animal confined within viewing cage 100 while providing an aesthetically pleasing viewing environment. As will be appreciated, these implements may also be mounted to an exterior surface of cage 100 for use by animals released from cage 100 such as trained birds.

Driftwood assembly 102 comprises a natural indiscriminate body member 106 formed from a piece of driftwood and clamping means for semi-permanently securing body member 106 to non-aquatic viewing cage 100. As best seen in FIGS. 6 and 7, the clamping means associated with the decorative implements include a pair of plate-like clamping members or washers 108 located on opposite adjacent sides of wire frame rails 110 which define floor portion 112 of viewing cage 100. Fastener means such as a screw 114 or the like extend through apertures 116 formed in washers 108 and into a portion of driftwood body member 106 for mechanically attaching driftwood assembly 102 to viewing cage 100. More particularly, upon tightening screw 114 into driftwood body member 106, a "clamping" engagement is caused between the pair of washers 108 and wire frame rails 110 such that driftwood assembly 102 is rigidly secured to and supported from floor portion 112 of cage 100. It will be appreciated, that washers 108 are sized to provide sufficient peripheral surface area for distributing the loading and for lockingly clamping at least two of wire frame rails 110.

With continued reference to FIG. 5, a second ornamental device is shown mounted to a side portion of viewing cage 100. It will be appreciated, that the second ornamental implement, shown as a driftwood perch assembly 104, has clamping means associated therewith which is substantially identical to that previously described with reference to driftwood assembly 102. Driftwood perch assembly 104 includes a perch member 120 formed of a natural indiscriminate piece of driftwood which is supported so as to extend outwardly from a side wall of viewing cage 100 by a pair of posts 122. As is apparent, one end of each post 122 is secured to perch member 120 while its opposite end is secured to screw 114. Screw 114 is operatively associated with the pair of washers 108 to securely "clamp" driftwood perch assembly 104 to the side wall of viewing cage 100. As will be appreciated, driftwood assembly 102 and driftwood perch assembly 104 can be semi-permanently secured to any suitable inner or outer surface of viewing cage 100.

With reference now to FIG. 8, an alternative embodiment for the semi-permanent clamping means is shown which is applicable for use with driftwood assembly 102 and driftwood perch assembly 104. More particularly, the clamping means includes a threaded post 124 threadably secured into a portion of body member 106 of driftwood assembly 102 or posts 122 of driftwood perch assembly 104. Threaded post 124 is adapted to extend through apertures 116 of washers 108 and between adjacent wire frame rails 110 such that post 124 extends outwardly therefrom. A locking fastener, such as a wing nut 126, is threadably tightened onto post 124 for rigidly "clamping" the washers 108 and, in turn, the decorative implements to viewing cage 100.

With reference now to FIG. 9, an additional decorative natural indiscriminate implement for use in viewing cage 100 is shown. More particularly, a driftwood swing assembly 130 is shown to include a swing member 132 made from a piece of naturally indiscriminate driftwood and a first hook member 134. First hook member 134 is provided for permitting driftwood swing assembly 130 to be removably attached to a complementary second hook member 136 attached to any suitable portion of body member 106. In this manner, any number of supplemental implements, such as driftwood swing assembly 130 can be readily supported on viewing cage 100.

It should be noted that the terms assembly, device, article and implement can be used interchangeably and are considered to define the combination of a decorative body member and mounting means in accordance with the preferred embodiment of the present invention. Likewise, while the above description constitute the preferred embodiments of the present invention, it will be appreciated that the present invention is acceptable to modification, variation and change without departing from the proper scope and fair meaning of the accompanying claims.

What is claimed is:

1. An ornamental device for use in a viewing tank comprising:
   a decorative artificial plant; and
   at least one suction cup for semi-permanent securing of said artificial plant to an inner surface of said viewing tank so as to directly fixably locate said artificial plant thereto, said at least one suction cup being secured to said artificial plant.

2. The ornamental device of claim 1 wherein said at least one suction cup is non-releaseably secured to said artificial plant.

* * * * *